(12) United States Patent
Ling et al.

(10) Patent No.: US 11,630,300 B2
(45) Date of Patent: Apr. 18, 2023

(54) NEAR-EYE DISPLAY DEVICE, AUGMENTED REALITY APPARATUS AND VIRTUAL REALITY APPARATUS

(71) Applicant: BOE Technology Group Co., Ltd., Beijing (CN)

(72) Inventors: Qiuyu Ling, Beijing (CN); Wei Wang, Beijing (CN); Xiandong Meng, Beijing (CN); Pengxia Liang, Beijing (CN); Xianqin Meng, Beijing (CN); Gaolei Xue, Beijing (CN); Fangzhou Wang, Beijing (CN); Meng Yan, Beijing (CN); Peilin Liu, Beijing (CN); Yujiao Guo, Beijing (CN); Yishan Tian, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 365 days.

(21) Appl. No.: 16/919,693

(22) Filed: Jul. 2, 2020

(65) Prior Publication Data
US 2021/0063737 A1    Mar. 4, 2021

(30) Foreign Application Priority Data
Aug. 30, 2019    (CN) .......................... 201910817529.5

(51) Int. Cl.
*G02B 27/01*    (2006.01)
*G02B 27/00*    (2006.01)
*G02B 27/12*    (2006.01)

(52) U.S. Cl.
CPC ..... *G02B 27/0101* (2013.01); *G02B 27/0093* (2013.01); *G02B 27/123* (2013.01)

(58) Field of Classification Search
CPC ... G02B 2027/0105–0198; G02B 27/01–0189; G03B 21/00–64; H04N 9/31–3197
See application file for complete search history.

(56) References Cited

U.S. PATENT DOCUMENTS 10,168,531 B1    1/2019    Trail et al.
10,319,266 B1    6/2019    Percival et al.
(Continued)

FOREIGN PATENT DOCUMENTS

CN    205539744 U    8/2016
CN    106873161 A    6/2017
(Continued)

OTHER PUBLICATIONS

First Office Action with Search Report dated Jan. 29, 2021 corresponding to Chinese application No. 201910817529.5.

*Primary Examiner* — Bao-Luan Q Le
*Assistant Examiner* — Christopher A Lamb, II
(74) *Attorney, Agent, or Firm* — Nath, Goldberg & Meyer; Joshua B. Goldberg (57) ABSTRACT

Provided is a near-eye display device including: a base substrate including first and second surfaces opposite to each other, an optical element array on the first surface, and a pixel island array and a sensor array that are on the second surface and are coupled to each other. The pixel island array emits first pixel light to the optical element array, such that the first pixel light passes through the optical element array and then reaches a human eye. The sensor array receives light of the first pixel light reflected by the human eye, determines a position of a pupil center of the human eye according to an intensity distribution of the reflected light, determines pixels corresponding to the position of the pupil center in the pixel island array, and controls the pixels to emit second pixel light.

17 Claims, 5 Drawing Sheets

(56) References Cited

U.S. PATENT DOCUMENTS

| | | | | |
|---|---|---|---|---|
| 2013/0285885 A1* | 10/2013 | Nowatzyk | .......... | G02B 27/0172 |
| | | | | 345/8 |
| 2014/0168782 A1* | 6/2014 | Tang | ................ | G02F 1/133611 |
| | | | | 359/628 |
| 2017/0039960 A1* | 2/2017 | Jepsen | ................ | G02B 27/0172 |
| 2019/0179154 A1 | 6/2019 | Sprague | | |

FOREIGN PATENT DOCUMENTS

| CN | 108428716 A | 8/2018 |
|---|---|---|
| CN | 108700934 A | 10/2018 |
| CN | 108921951 A | 11/2018 |
| CN | 109256042 A | 1/2019 |

\* cited by examiner

NEAR-EYE DISPLAY DEVICE, AUGMENTED REALITY APPARATUS AND VIRTUAL REALITY APPARATUS

CROSS REFERENCE TO RELATED APPLICATIONS

This application claims the priority of Chinese patent application No. 201910817529.5 filed on Aug. 30, 2019, the content of which is incorporated herein in its entirety by reference.

TECHNICAL FIELD

The present disclosure relates to the field of display technologies, and in particular, to a near-eye display device, an augmented reality apparatus, and a virtual reality apparatus.

BACKGROUND

In recent years, near-eye display technologies are developing rapidly.

Among the near-eye display technologies, the Virtual Reality (VR) technology and the Augmented Reality (AR) technology dominate, and provide excellent audio-visual experience to people.

SUMMARY

Embodiments of the present disclosure provide a near-eye display device, an augmented reality apparatus, and a virtual reality apparatus.

A first aspect of the present disclosure provides a near-eye display device, including a base substrate, a pixel island array, an optical element array, and a sensor array; wherein the base substrate includes a first surface and a second surface opposite to each other, the optical element array is on the first surface, the pixel island array and the sensor array are on the second surface, and the sensor array and the pixel island array are coupled to each other;

the pixel island array is configured to emit first pixel light to the optical element array, such that the first pixel light passes through the optical element array and then reaches a human eye; and the sensor array is configured to receive reflected light of the first pixel light reflected by the human eye, determine a position of a pupil center of the human eye according to an intensity distribution of the reflected light, determine pixels corresponding to the position of the pupil center in the pixel island array, and control the pixels to emit second pixel light.

In an embodiment, the pixel island array includes a plurality of pixel islands, the optical element array includes a plurality of optical elements, the sensor array includes a plurality of light sensors, the plurality of pixel islands of the pixel island array are in one-to-one correspondence with the plurality of optical elements of the optical element array, the plurality of pixel islands of the pixel island array are in one-to-one correspondence with the plurality of light sensors of the sensor array, and each of the plurality of light sensors is coupled to a corresponding pixel island.

In an embodiment, each of the plurality of light sensors is in contact with the corresponding pixel island.

In an embodiment, a center of each of the plurality of optical elements, a center of the pixel island corresponding to the optical element, and a center of the human eye are on a same straight line.

In an embodiment, each of the plurality of pixel islands is within one focal length of a corresponding optical element.

In an embodiment, each of the plurality of optical elements is a microlens.

In an embodiment, a material of each of the plurality of optical elements includes polymethyl methacrylate.

In an embodiment, each of the plurality of pixel islands includes a plurality of pixels, each of the plurality of light sensors is configured to determine a plurality of target pixels corresponding to the position of the pupil center from the plurality of pixels of a corresponding pixel island, and to control the plurality of target pixels to emit the second pixel light.

In an embodiment, the optical element array is configured to form an enlarged virtual image at a same virtual image plane by using the first pixel light, and the virtual image plane is in a space close to the second surface.

In an embodiment, a material of the base substrate includes at least one of polymethyl methacrylate and silicon nitride.

In an embodiment, each of the plurality of optical elements has a viewing angle $\theta$ and a focal length $f$, each of the plurality of pixel islands has a size $D$ in a direction parallel to the second surface, and $\theta=\arctan(D/f)$.

In an embodiment, a distance $d1$ is provided between any adjacent two of the plurality of optical elements, and $d1 = L \times \tan \theta$.

In an embodiment, a distance between the human eye and the base substrate is $L$, a distance $d2$ is provided between any adjacent two of the plurality of pixel islands, and $d2 = (L+f) \times \tan \theta$.

In an embodiment, a plurality of pixels of each of the plurality of pixel islands emit light of a same color, and different ones of the plurality of pixel islands emit light of different colors.

A second aspect of the present disclosure provides a wearable augmented reality apparatus, including the near-eye display device according to any one of the embodiments of the first aspect of the present disclosure.

In an embodiment, the pixel island array includes a plurality of pixel islands, a first gap is provided between any adjacent two of the plurality of pixel islands, and is configured to transmit ambient light; and the optical element array includes a plurality of optical elements, a second gap is provided between any adjacent two of the plurality of optical elements, and is configured to transmit the ambient light.

In an embodiment, each of the plurality of optical elements is a microlens having a diameter greater than or equal to 0.5 millimeters and less than or equal to 1.2 millimeters.

A third aspect of the present disclosure provides a wearable virtual reality apparatus, including the near-eye display device according to any one of the embodiments of the first aspect of the present disclosure.

In an embodiment, the optical element array of the near-eye display device includes a plurality of optical elements, and each of the plurality of optical elements is a microlens, which has a diameter greater than or equal to 0.5 millimeters and less than or equal to 2 millimeters.

DETAILED DESCRIPTION

To make the aforementioned objects, features and advantages of the present disclosure more comprehensible, the present disclosure will be further described below in detail with reference to the accompanying drawings and exemplary embodiments.

The inventors of the present inventive concept have found that, the best viewing position and the best viewing angle of an existing near-eye display device with a VR display function, an AR display function, and/or the like are fixed. That is, human eyes must view (observe) a picture at the fixed best viewing position and at the fixed best viewing angle to achieve a better viewing effect.

However, in a practical application, when a user wears a near-eye display device, the user's eyes are typically very close to the near-eye display device. Therefore, when the near-eye display device displays a picture, the viewing effect for the picture is greatly influenced by a viewing angle for each of the human eyes. When a pupil of each of the human eyes rotates, some light rays from the picture may not enter the human eye, such that the user cannot observe a complete (or full) picture.

Further, when the pupil of each of the human eyes rotates, light rays emitted from different parts of the near-eye display device may interfere with each other at the current viewing angle, such that a crosstalk of the picture may occur and the user may not observe a clear picture.

In view of at least the foregoing, embodiments of the present disclosure provide a near-eye display device, an augmented reality apparatus and a virtual reality apparatus, which may at least track a position of a pupil center of a human eye in real time, control different pixels to display a picture to make the picture adapt to the human eye after the position of the pupil center changes, such that the human eye may observe a complete and clear picture in real time.

Figure 1:
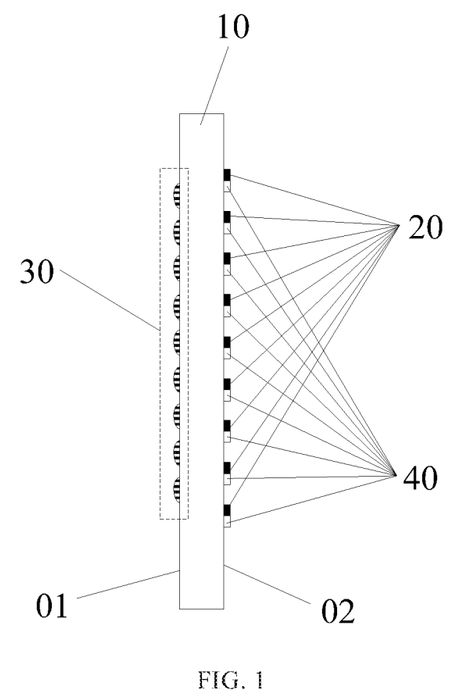
FIG. 1 is a schematic diagram showing a structure of a near-eye display device according to an embodiment of the present disclosure.

FIG. 1 illustrates a structure of a near-eye display device according to an embodiment of the present disclosure. As shown in FIG. 1, the near-eye display device includes a base substrate 10, a pixel island array 20, an optical element array 30, and a sensor array 40. The base substrate 10 includes a first surface 01 and a second surface 02 that are opposite to each other, the optical element array 30 is disposed on the first surface 01, the pixel island array 20 and the sensor array 40 are disposed on the second surface 02, and the sensor array 40 and the pixel island array 20 are coupled to each other.

In an embodiment, the pixel island array 20 is configured to emit first pixel light toward the optical element array 30 such that the first pixel light passes through the optical element array 30 and then reaches a human eye. The sensor array 40 is configured to receive light of the first pixel light reflected from the human eye, determine a position of a pupil center of the human eye according to an intensity distribution of the reflected light, determine pixels corresponding to the position of the pupil center in the pixel island array 20, and control the pixels to emit second pixel light.

In an embodiment of the present disclosure, the first surface 01 is a surface of the base substrate 10 proximal to the human eye, and the second surface 02 is a surface of the base substrate 10 distal to the human eye. The pixel island array 20 disposed on the second surface 02 may emit the first pixel light. The first pixel light may reach the human eye after passing through the optical element array 30 disposed on the first surface 01, and is reflected by the human eye. In addition, the sensor array 40 disposed on the second surface 02 may receive light reflected by the human eye, and determine the current position of the pupil center of the human eye according to an intensity distribution of the reflected light, so as to determine pixels corresponding to the current position of the pupil center in the pixel island array 20, and control the pixels emit the second pixel light. For example, the first light may be emitted from a first portion of the pixels of the pixel island array 20, the second light may be emitted from a second portion of the pixels of the pixel island array 20, and the second portion of the pixels may be different from the first portion of the pixels. In this way, the near-eye display device may track the position of the pupil center of the human eye in real time, and then control different pixels to display a picture in real time, so as to adjust the picture so that the picture adapts to the human eye after the position of the pupil center thereof changes. Therefore, the human eye may observe a complete and clear picture in real time.

In an embodiment, the base substrate 10 may be made of a transparent material for transmitting light. Optionally, the material of the base substrate 10 may include at least one of polymethyl methacrylate (PMMA) and silicon nitride ($Si_3N_4$). In a practical application, polymethyl methacrylate has a relatively small weight per unit volume, and thus, it may reduce a weight of the near-eye display device such that the near-eye display device is easy to be worn by a user. Alternatively, in addition to polymethyl methacrylate, the base substrate 10 may be made of a transparent material (e.g., silicon nitride) commonly used in a base substrate of a liquid crystal display (LCD), such that the near-eye display device may be more compact. However, an embodiment of the present disclosure is not limited thereto.

Figure 2:
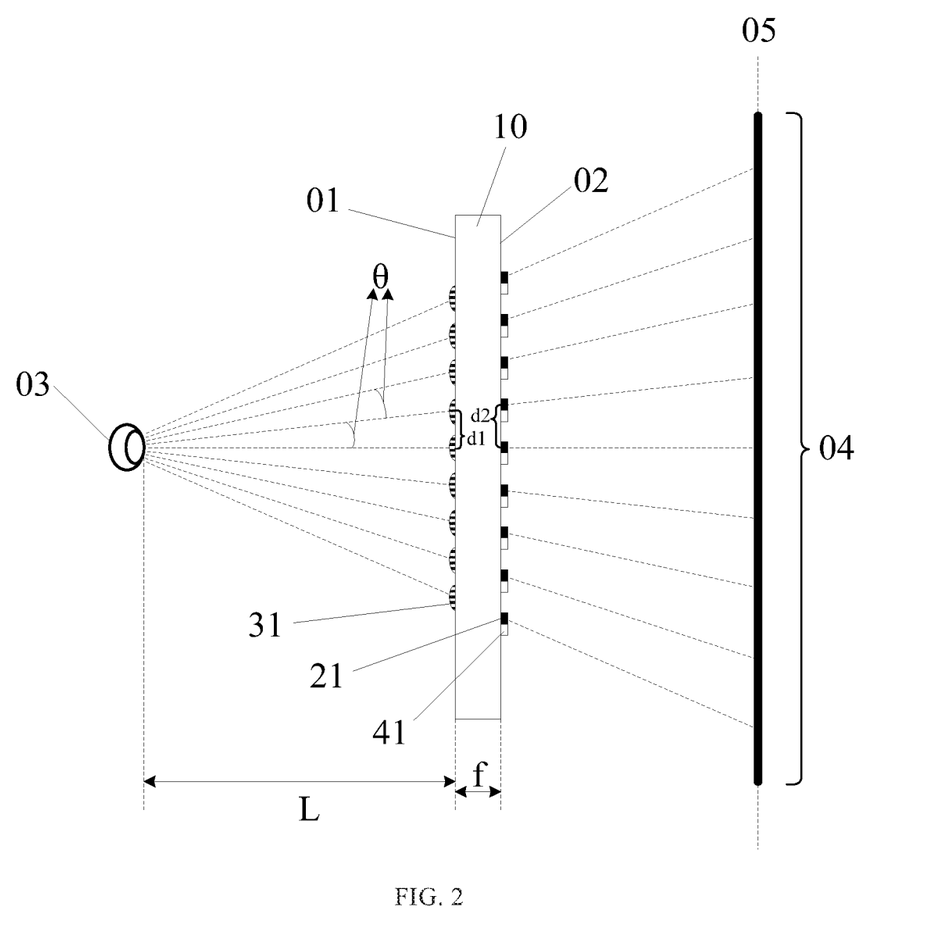
FIG. 2 is a schematic diagram showing that a human eye is wearing a near-eye display device according to an embodiment of the present disclosure to view a picture.
Figure 4:
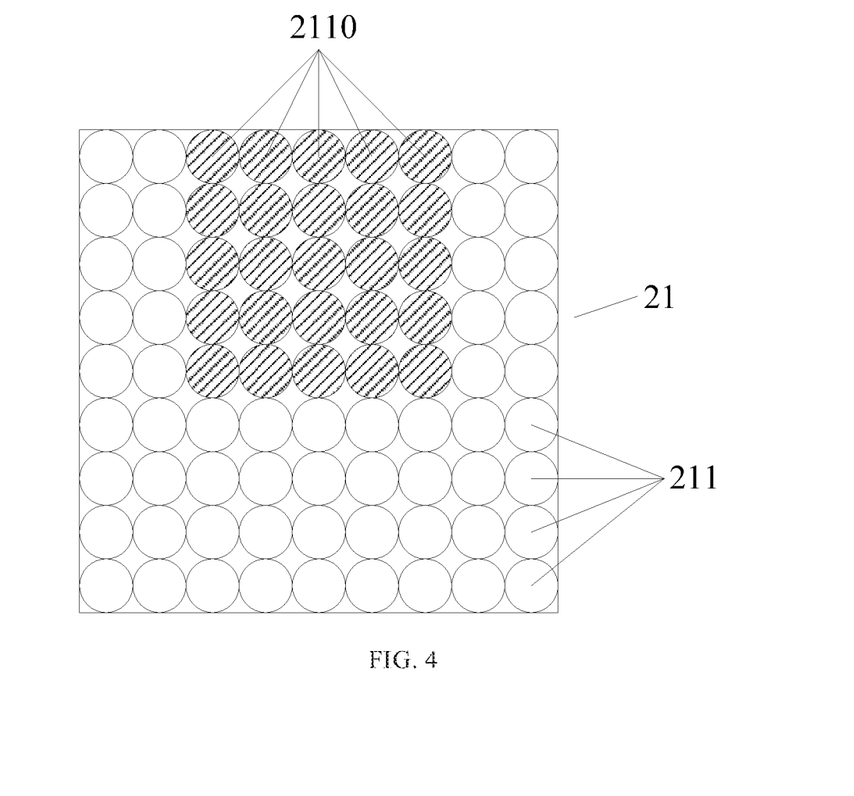
FIG. 4 is a schematic diagram showing a structure of a pixel island, and showing that a light sensor determines a plurality of target pixels corresponding to a pupil center at a first time from a plurality of pixels of a corresponding pixel island, according to an embodiment of the present disclosure.
Figure 5:
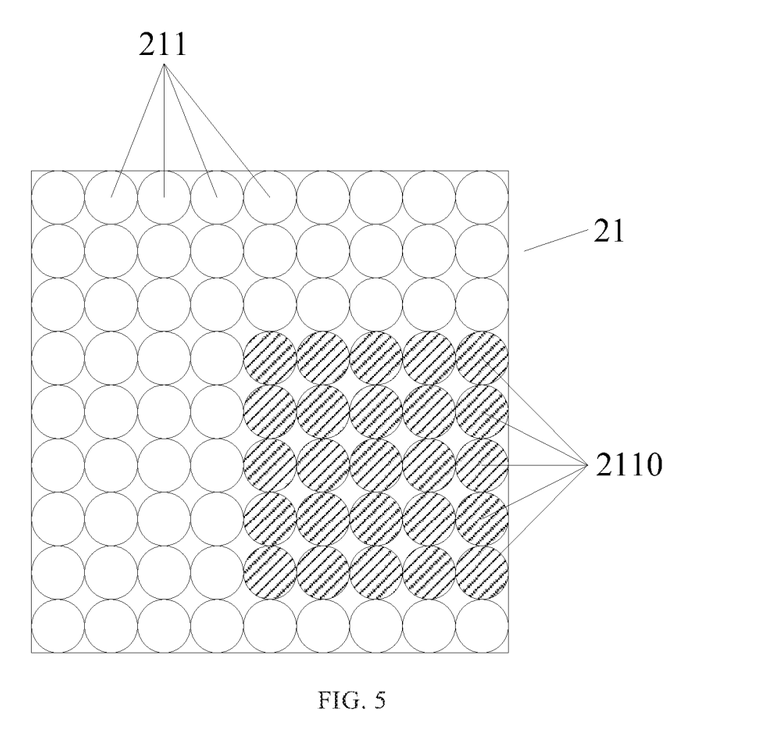
FIG. 5 is a schematic diagram showing a structure of a pixel island, and showing that a light sensor determines a plurality of target pixels corresponding to a pupil center at a second time from a plurality of pixels of a corresponding pixel island, according to an embodiment of the present disclosure.

FIG. 2 shows that a human eye is wearing a near-eye display device according to an embodiment of the present disclosure to view a picture. Referring to FIGS. 1 and 2, the pixel island array 20 includes a plurality of pixel islands 21, and the plurality of pixel islands 21 may be arranged on the second surface 02 of the base substrate 10 according to the viewing requirements of a human eye 03. Each of the pixel islands 21 may include a plurality of pixels 211 (see FIGS. 4 and 5), i.e. one of the pixel islands 21 is actually one cluster of pixels. The plurality of pixels 211 may also be arranged (e.g., arranged in an array) according to the viewing requirement of the human eye 03. One of the pixel islands 21 may include a plurality of pixels of a same color (i.e., the plurality of pixels of one of the pixel islands 21 may emit light of a same color), and the colors of light emitted from the pixels in different pixel islands 21 may be different, such that the uniformity of the display effect may be ensured while the real-time tracking of the position of the pupil center of human eyes is achieved. However, embodiments of the present disclosure are not limited thereto, and for example, the pixels of each of the pixel islands 21 may emit light of three colors of R, G, and B, respectively. Each of the pixel islands 21 corresponds to a small display panel, and for a full picture to be viewed, each of the pixel islands 21 may only display a part of the full picture to be viewed. Image planes of the pixel islands 21 amplified by the optical element array 30 may be spliced (or superposed) together to form the full picture to be viewed (i.e. an amplified virtual image 04), as shown in FIG. 2, such that the virtual image 04 may be viewed (or observed) by the human eye 03. For example, each pixel island 21 may have a shape of rectangle (or even square), as shown in FIGS. 4 and 5. However, the present disclosure is not limited thereto, and for example, each pixel island 21 may alternatively have a shape of regular hexagon.

In a practical application, since the achievement of the display effect of augmented reality needs a certain amount of ambient light, if the near-eye display device is employed to realize augmented reality display, a certain gap needs to be provided between any adjacent two of the pixel islands 21, and the gap is configured to transmit the ambient light. Since the achievement of the display effect of the virtual reality does not require any ambient light, if the near-eye display device is employed to realize virtual reality display, no gap may be provided between any adjacent two of the pixel islands 21, or a light shielding sheet may be provided on a portion of the second surface of the base substrate 10 between any adjacent two of the pixel islands 21.

Referring to FIGS. 1 and 2, the optical element array 30 may include a plurality of optical elements 31, and the plurality of optical elements 31 may be arranged on the first surface 01 of the base substrate 10 according to the viewing requirement of the human eye. In a practical application, each of the optical elements 31 may be a microlens (e.g., a convex lens). If the near-eye display device is employed to realize augmented reality display, a diameter of the microlens may be greater than or equal to 0.5 mm and less than or equal to 1.2 mm, and the diameter of the microlens may be selected within this range according to a specific augmented reality display scene, such that a gap is provided between any adjacent two microlenses. When the near-eye display device is employed to realize augmented reality display, an aperture of a single microlens cannot be too large, in a case where the number of microlenses meeting display requirements is fixed, a large diameter of each of microlenses may result in a small gap or even no gap between any adjacent two of the microlenses, and in this case, ambient light may not enter the human eye, and thus the display effect of augmented reality may not achieved. Therefore, the diameter of each microlens needs to be small, such that a certain gap is provided between any adjacent two of the optical elements (e.g., microlenses), and this gap may be configured to transmit the ambient light. If the near-eye display device is employed to realize virtual reality display, since the achievement of the display effect of virtual reality does not require any ambient light, the diameter of each of the microlenses may be larger. In a practical application, the diameter of each of the microlens may be greater than or equal to 0.5 mm and less than or equal to 2 mm, and the diameter of each of the microlenses may be selected within this range according to the specific virtual reality display scene.

In an embodiment, referring to FIG. 2, for any one of the optical elements 31, a center of the optical element 31, a center of the pixel island 21 corresponding to the optical element 31, and a center of the human eye are located on a same straight line, such that the light emitted from each pixel island 21 may pass through the corresponding optical element 31 for optical processing, and the light optically processed by each optical element 31 may be received by the human eye.

In an embodiment, referring to FIG. 2, the optical element array 30 is configured to form an enlarged virtual image on a same virtual image surface (e.g., virtual image plane) 05 by using the first pixel light, the virtual image plane 05 is located in a space close to the second surface 02 and has a predetermined depth of field with respect to the optical element array 30. In a practical application, optionally, each pixel island 21 may be located within a range of one focal length of the optical element 31 corresponding to the pixel island 21, such that the light emitted from the pixel island 21 may pass through the corresponding optical element 31, and then form an enlarged virtual image at the virtual image plane 05 in the space close to the second surface 02.

Further, in order to ensure the viewing effect for human eyes, the enlarged virtual images formed at the same virtual image plane by the first pixel light emitted by the pixel islands 21 should be complementary to form a complete picture, which may be realized by designing parameters such as a distance between the human eye and the optical elements 31 (i.e., the optical element array 30), a thickness of the base substrate 10, and the like in a practical application.

For example, referring to FIG. 2, the thickness of the base substrate 10 may be less than or equal to a focal length f of each of the optical elements 31, such that each pixel island 21 may be located within a range of one focal length f of the corresponding optical element 31. Since a viewing angle θ of a single optical element 31 (it should be understood that, the viewing angle θ of a single optical element 31 is the maximum angle between two lines of sight for the human eye 03 corresponding to the single optical element 31, which pass through both of the outer edges of a virtual image formed by a single pixel island corresponding to the single optical element 31 emitting light to the single optical element 31) should ensure that light rays emitted from any position of the corresponding pixel island 21 may be received by the human eye 03, the viewing angle θ of the single optical element 31 satisfies the equation of θ=arctan (D/f), where D is a size of the pixel island 21 (e.g., the maximum size of each pixel island 21 in a direction parallel to the second surface 02 (e.g., the vertical direction in FIGS. 1 to 3)). An interval d1 between any adjacent two optical elements 31 satisfies the equation of d1=L×tan θ, and an interval d2 between any adjacent two pixel islands 21 satisfies the equation of d2=(L+f)×tan θ, where L is an exit pupil distance, i.e., a distance between the pupil of the human eye 03 and the base substrate 10. Designing the near-eye display device according to the above parameters may ensure that complementary amplified virtual images are formed at the same virtual image plane 05 by the first pixel light emitted from the pixel islands 21.

In an embodiment, a material of each of the optical elements 31 may include polymethyl methacrylate. Polymethyl methacrylate is light and transparent, and thus selecting polymethyl methacrylate as the material of each of the optical elements 31 may reduce the weight of the near-eye display device, thereby ensuring that a user may wear the near-eye display device comfortably. Alternatively, the material of each of the optical elements 31 may include another material, such as a transparent glass material, a resin material, an optical film material, or the like, which is not limited in an embodiment of the present disclosure.

The sensor array 40 includes a plurality of light sensors 41. In an embodiment of the present disclosure, the plurality of pixel islands 21 of the pixel island array 20 are in one-to-one correspondence with the plurality of optical elements 31 of the optical element array 30, and the plurality of pixel islands 21 of the pixel island array 20 are in one-to-one correspondence with the plurality of light sensors 41 of the sensor array 40. Each of the light sensors 41 is coupled to the corresponding pixel island 21. Optionally, each of the light sensors 41 may be disposed adjacent to the corresponding pixel island 21, for example, each of the light sensors 41 may be in contact with the corresponding pixel island 21. Correspondingly, each light sensor 41 may be configured to determine a plurality of target pixels corresponding to the position of the pupil center of the human eye 03 from the plurality of pixels of the corresponding pixel island 21, and control the plurality of target pixels to emit the second pixel light. For example, the plurality of pixel islands 21 of the pixel island array 20 may be arranged in a plurality of rows and a plurality of columns, the plurality of optical elements 31 of the optical element array 30 may be arranged in a plurality of rows and a plurality of columns, and the plurality of light sensors 41 of the sensor array 40 may be arranged in a plurality of rows and a plurality of columns. For example, each light sensor 41 may be a charge coupled device (CCD) camera, a complementary metal oxide semiconductor (CMOS) sensor, or the like. It should be understood that one user (i.e., person) has two human eyes 03, each of the two human eyes 03 corresponds to one pixel island array 20, one optical element array 30, and one sensor array 40, as shown in FIG. 2. As described above, referring to FIG. 2, for each of the two human eyes 03 of one user, the center of any one optical element 31 in the optical element array 30 corresponding to the human eye 03, the center of the pixel island 21 corresponding to the optical element 31, and the center of the human eye are located on a same straight line.

When a user wears a display apparatus including the near-eye display device, a center of an eyeball of a human eye hardly moves, but the pupil of the human eye may change its position with the movement of a sight line. Generally, the movement range of the pupil of the human eye may be 2 mm, i.e., the position of the pupil center of the human eye may change within the range of 4 mm in any direction. For any one pixel island 21, the pixel island 21 may emit the first pixel light, the first pixel light may reach the human eye 03 after passing through the optical element 31 corresponding to the pixel island 21, and is reflected by the human eye 03, such that the corresponding light sensor 41 may receive the light reflected by the human eye 03.

Figure 3:
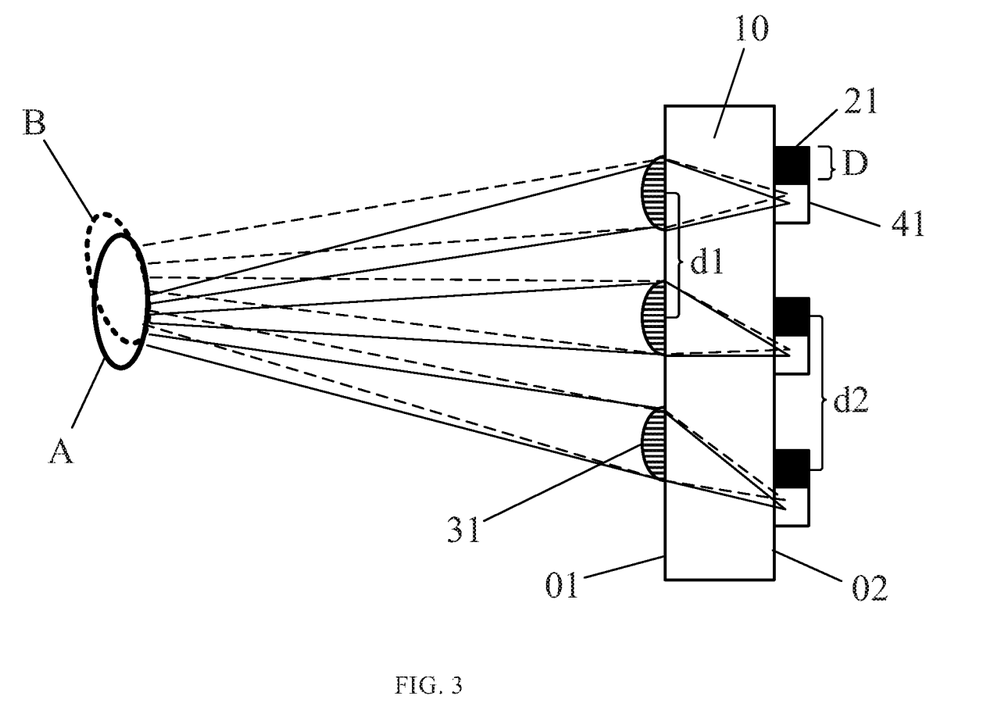
FIG. 3 is a schematic diagram showing the details that a near-eye display device according to an embodiment of the present disclosure is worn by a human eye for viewing a picture.

FIG. 3 is a schematic diagram showing the details that a near-eye display device according to an embodiment of the present disclosure is worn by a human eye for viewing a picture. As shown in FIG. 3, when the pupil is at position A, the light rays reflected by the pupil may be shown by the solid lines in FIG. 3. After the pupil moves from position A to position B, the light rays reflected by the pupil may be shown by the dashed lines in FIG. 3. As may be seen from FIG. 3, when the pupil moves from position A to position B, a spot of the reflected light received by each of the light sensors 41 moves upward accordingly. Here, the spot of light is a part of the reflected light with a relatively concentrated intensity. Therefore, each of the light sensors 41 may determine the current position of the pupil center of the human eye according to a position of the spot of the reflected light with a relatively concentrated intensity. In a practical application, each of the light sensors 41 may pre-store a correspondence (or correspondence relationship) between positions of the light spot and positions of the pupil center, and a correspondence between each of the positions of the pupil center and pixels in each pixel island 21. These correspondences may be acquired in advance through machine training, actual measurements, and/or the like, which is not specifically limited in the embodiment of the present disclosure.

FIG. 4 is a schematic diagram showing a structure of each of the pixel islands 21, and showing that the light sensor 41 corresponding to the pixel island 21 determines a plurality of target pixels 2110 corresponding to the pupil center of the human eye 03 at a first time from the plurality of pixels 211 of the pixel island 21, according to an embodiment of the present disclosure. As shown in FIG. 4, since each light sensor 41 may detect a distance by which the position of the light spot has moved upward (see FIG. 3), the light sensor 41 may determine a plurality of target pixels 2110 (e.g., an upper portion of pixels among the plurality of pixels 211 of the corresponding pixel island 21) corresponding to the position of the pupil center at this time, from the plurality of pixels 211 of the corresponding pixel island 21 by querying the pre-stored correspondences, and control the plurality of target pixels 2110 to emit the second pixel light. The second pixel light emitted from the plurality of target pixels 2110 of each pixel island 21 passes through the corresponding optical element 31, and then reaches the human eye (e.g., reaches the position of the pupil center of the human eye).

For example, when the pupil moves from position B toward the lower right, each light sensor 41 may determine the position of the pupil center of the human eye at this time, may determine a plurality of target pixels 2110 (e.g., a lower-right portion of pixels among the plurality of pixels 211 of the corresponding pixel island 21) corresponding to the position of the pupil center at this time from the plurality of pixels 211 of the corresponding pixel island 21, as shown in FIG. 5, and then may control the plurality of target pixels 2110 to emit the second pixel light.

In the foregoing embodiments of the present disclosure, the near-eye display device includes the base substrate, the pixel island array, the optical element array, and the sensor array. The optical element array is disposed on the first surface of the base substrate, the pixel island array and the sensor array are disposed on the second surface of the base substrate, and the sensor array and the pixel island array are coupled to each other. The pixel island array may emit the first pixel light, and the first pixel light may pass through the optical element array and then reach the human eye, and are reflected by the human eye. Then, the sensor array may receive the light reflected by the human eye, and determine the current position of the pupil center of the human eye according to the intensity distribution of the reflected light, so as to determine pixels corresponding to the position of the pupil center in the pixel island array, and control the determined pixels to emit the second pixel light. Thus, the near-eye display device may track the position of the pupil center of the human eye in real time, and control different pixels to display a picture in real time to adjust the picture such that the picture adapts to the human eye after the position of the pupil center changes. Therefore, the human eye may observe a complete and clear picture in real time.

An embodiment of the present disclosure provides a wearable augmented reality apparatus including the near-eye display device as described above.

In an embodiment, the pixel island array includes a plurality of pixel islands, and a first gap (or first interval/distance) is provided between any adjacent two of the pixel islands and is configured to transmit ambient light. The optical element array includes a plurality of optical elements, and a second gap (or second interval/distance) is provided between any adjacent two of the optical elements and is configured to transmit the ambient light.

In an embodiment, each of the optical elements is a microlens (e.g., convex lenses), which may have a diameter greater than or equal to 0.5 millimeters and less than or equal to 1.2 millimeters.

In the present embodiment of the present disclosure, the near-eye display device of the augmented reality apparatus includes the base substrate, the pixel island array, the optical element array, and the sensor array. The optical element array is disposed on the first surface of the base substrate, the pixel island array and the sensor array are disposed on the second surface of the base substrate, and the sensor array and the pixel island array are coupled to each other. The pixel island array may emit the first pixel light, and the first pixel light may pass through the optical element array and then reach the human eye, and are reflected by the human eye. Then, the sensor array may receive the light reflected by the human eye, and determine the current position of the pupil center of the human eye according to the intensity distribution of the reflected light, so as to determine pixels corresponding to the position of the pupil center in the pixel island array, and control the determined pixels to emit the second pixel light. Thus, the near-eye display device may track the position of the pupil center of the human eye in real time, and control different pixels to display a picture in real time to adjust the picture such that the picture adapts to the human eye after the position of the pupil center changes. Therefore, the human eye may observe a complete and clear picture in real time.

An embodiment of the present disclosure provides a wearable virtual reality apparatus including the near-eye display device as described above.

In an embodiment, each of the optical elements 31 of the optical element array 30 of the near-eye display device is a microlens, which may have a diameter greater than or equal to 0.5 millimeters and less than or equal to 2 millimeters.

In the present embodiment of the present disclosure, the near-eye display device of the virtual reality apparatus includes the base substrate, the pixel island array, the optical element array, and the sensor array. The optical element array is disposed on the first surface of the base substrate, the pixel island array and the sensor array are disposed on the second surface of the base substrate, and the sensor array and the pixel island array are coupled to each other. The pixel island array may emit the first pixel light, and the first pixel light may pass through the optical element array and then reach the human eye, and are reflected by the human eye. Then, the sensor array may receive the light reflected by the human eye, and determine the current position of the pupil center of the human eye according to the intensity distribution of the reflected light, so as to determine pixels corresponding to the position of the pupil center in the pixel island array, and control the determined pixels to emit the second pixel light. Thus, the near-eye display device may track the position of the pupil center of the human eye in real time, and control different pixels to display a picture in real time to adjust the picture such that the picture adapts to the human eye after the position of the pupil center changes. Therefore, the human eye may observe a complete and clear picture in real time.

It should be noted that the foregoing embodiments of the present disclosure are described in a progressive manner, and the description of each of the embodiments may focus on differences from other embodiments. Thus, the same or similar parts of the embodiments may be referred to each other.

It should be further noted that, relational terms such as first and second, and the like used herein are solely for distinguishing one entity or operation from another entity or operation, but are not intended to require or imply any actual such relationship or order between such entities or operations. Further, the terms "include", "comprise" or any other variation thereof, are intended to cover a non-exclusive inclusion, such that a process, method, product, or apparatus that has a list of elements contains not only those elements but also may include other elements not expressly listed or inherent to such a process, method, product, or apparatus. Without further limitation, an element defined by the phrase "comprising a/an . . . " does not exclude the presence of other identical elements from the process, method, product, or apparatus that comprises the element.

The near-eye display device, the augmented reality apparatus, and the virtual reality apparatus provided by the present disclosure have been described in detail above. The principles and implementations of the present disclosure are explained herein by using exemplary embodiments, which are intended to facilitate the understanding of the principles and the inventive concept of the present disclosure. Further, it will be apparent to one of ordinary skill in the art that changes may be made in the embodiments and their applications without departing from the principles of the present disclosure. Thus, the foregoing description is not intended to limit the scope of the present disclosure.

What is claimed is:

1. A near-eye display device, comprising a base substrate, a pixel island array, an optical element array, and a sensor array; wherein
   the base substrate comprises a first surface and a second surface opposite to each other, the optical element array is on the first surface, the pixel island array and the sensor array are on the second surface, and the sensor array and the pixel island array are coupled to each other;
   the pixel island array is configured to emit first pixel light to the optical element array, such that the first pixel light passes through the optical element array and then reaches a human eye; and
   the sensor array is configured to receive reflected light of the first pixel light reflected by the human eye, determine a position of a pupil center of the human eye according to an intensity distribution of the reflected light, determine pixels corresponding to the position of the pupil center in the pixel island array, and control the pixels to emit second pixel light;
   wherein the pixel island array comprises a plurality of pixel islands, the optical element array comprises a plurality of optical elements, the sensor array comprises a plurality of light sensors, the plurality of pixel islands of the pixel island array are in one-to-one correspondence with the plurality of optical elements of the optical element array, the plurality of pixel islands of the pixel island array are in one-to-one correspondence with the plurality of light sensors of the sensor array, and each of the plurality of light sensors is coupled to a corresponding pixel island; and
   wherein each of the plurality of optical elements has a viewing angle $\theta$ and a focal length f, each of the plurality of pixel islands has a size D in a direction parallel to the second surface, and $\theta=\arctan(D/f)$.

2. The near-eye display device according to claim 1, wherein each of the plurality of light sensors is in contact with the corresponding pixel island.

3. The near-eye display device according to claim 1, wherein a center of each of the plurality of optical elements, a center of the pixel island corresponding to the optical element, and a center of the human eye are on a same straight line.

4. The near-eye display device according to claim 1, wherein each of the plurality of pixel islands is within one focal length of a corresponding optical element.

5. The near-eye display device according to claim 1, wherein each of the plurality of optical elements is a microlens.

6. The near-eye display device according to claim 1, wherein a material of each of the plurality of optical elements comprises polymethyl methacrylate.

7. The near-eye display device according to claim 1, wherein each of the plurality of pixel islands comprises a plurality of pixels, each of the plurality of light sensors is configured to determine a plurality of target pixels corresponding to the position of the pupil center from the plurality of pixels of a corresponding pixel island, and to control the plurality of target pixels to emit the second pixel light.

8. The near-eye display device according to claim 1, wherein the optical element array is configured to form an enlarged virtual image at a same virtual image plane by using the first pixel light, and the virtual image plane is in a space close to the second surface.

9. The near-eye display device according to claim 1, wherein a material of the base substrate comprises at least one of polymethyl methacrylate and silicon nitride.

10. The near-eye display device according to claim 1, wherein a distance between the human eye and the base substrate is L, a distance d1 is provided between any adjacent two of the plurality of optical elements, and $d1=L \times \tan\theta$.

11. The near-eye display device according to claim 1, wherein a distance between the human eye and the base substrate is L, a distance d2 is provided between any adjacent two of the plurality of pixel islands, and $d2=(L+f) \times \tan\theta$.

12. The near-eye display device according to claim 1, wherein a plurality of pixels of each of the plurality of pixel islands emit light of a same color, and different ones of the plurality of pixel islands emit light of different colors.

13. A wearable augmented reality apparatus, comprising the near-eye display device according to claim 1.

14. The augmented reality apparatus according to claim 13, wherein
the pixel island array comprises a plurality of pixel islands, a first gap is provided between any adjacent two of the plurality of pixel islands, and is configured to transmit ambient light; and
the optical element array comprises a plurality of optical elements, a second gap is provided between any adjacent two of the plurality of optical elements, and is configured to transmit the ambient light.

15. The augmented reality apparatus according to claim 14, wherein each of the plurality of optical elements is a microlens having a diameter greater than or equal to 0.5 millimeters and less than or equal to 1.2 millimeters.

16. A wearable virtual reality apparatus, comprising the near-eye display device according to claim 1.

17. The virtual reality apparatus according to claim 16, wherein the optical element array of the near-eye display device comprises a plurality of optical elements, and each of the plurality of optical elements is a microlens, which has a diameter greater than or equal to 0.5 millimeters and less than or equal to 2 millimeters.

* * * * *